| | |
|---|---|
| (12) United States Patent<br>Tsai et al. | (10) Patent No.: US 9,401,650 B2<br>(45) Date of Patent: Jul. 26, 2016 |

(54) POWER SUPPLY APPARATUS

(71) Applicant: 3Y POWER TECHNOLOGY (TAIWAN), INC., Taoyuan County (TW)

(72) Inventors: Chih-Chang Tsai, Taoyuan County (TW); Yuan-Hung Lin, Taoyuan County (TW); Tai-Yen Chung, Taoyuan County (TW)

(73) Assignee: 3Y POWER TECHNOLOGY (TAIWAN), INC., Taoyuan (TW)

( * ) Notice: Subject to any disclaimer, the term of this patent is extended or adjusted under 35 U.S.C. 154(b) by 439 days.

(21) Appl. No.: 13/929,797

(22) Filed: Jun. 28, 2013

(65) Prior Publication Data

US 2014/0001870 A1    Jan. 2, 2014

(30) Foreign Application Priority Data

Jun. 28, 2012    (CN) .......................... 2012 1 0217783

(51) Int. Cl.
| | |
|---|---|
| *H02J 1/00* | (2006.01) |
| *H02J 3/00* | (2006.01) |
| *H02M 3/335* | (2006.01) |
| *H05B 37/02* | (2006.01) |
| *H02M 3/158* | (2006.01) |
| *H02J 1/10* | (2006.01) |
| *H02M 1/00* | (2006.01) |

(52) U.S. Cl.
CPC ........... *H02M 3/33523* (2013.01); *H02J 1/102* (2013.01); *H02M 3/1584* (2013.01); *H05B 37/02* (2013.01); *H02M 2001/0032* (2013.01); *Y02B 70/16* (2013.01); *Y10T 307/707* (2015.04)

(58) Field of Classification Search
CPC ......... H05B 7/02; H05B 39/06; H02M 3/335; H02M 3/00; G05F 1/00; G05F 1/40; G05F 3/02; G06F 1/263; H02J 1/10; H02J 9/061; H02J 3/382
USPC .......... 307/80, 82, 66, 64, 43; 363/17, 97, 98, 363/26, 15; 315/308, 307, 246, 219; 323/282, 280, 304, 312–314
See application file for complete search history.

(56) References Cited

U.S. PATENT DOCUMENTS

| | | | | |
|---|---|---|---|---|
| 2003/0142513 A1* | 7/2003 | Vinciarelli | .............. | H02J 1/102<br>363/17 |
| 2008/0310195 A1* | 12/2008 | Seberger | ............... | H02M 3/158<br>363/26 |
| 2011/0234192 A1* | 9/2011 | Tong | ................... | G01R 31/2836<br>323/311 |
| 2012/0081009 A1* | 4/2012 | Shteynberg | .......... | H05B 33/083<br>315/122 |

\* cited by examiner

*Primary Examiner* — Rexford Barnie
*Assistant Examiner* — Jagdeep Dhillon
(74) *Attorney, Agent, or Firm* — Jianq Chyun IP Office (57) ABSTRACT

A power supply apparatus is provided. The power supply apparatus includes two power suppliers connected in parallel, and the two power suppliers supply electric power to an electronic product at the same time. According to the present invention, when a load is a light load, the conductive impedance of an output isolation switch-component (for example, a metal-oxide-semiconductor field-effect transistor (MOSFET)) in each power supplier is changed/adjusted to balance the voltages on two light-loading setting points (not the source or drain of the output isolation switch-component (MOSFET)). If the voltages on the two light-loading setting points are not balanced (i.e., a reverse current is about to flow into the power supplier), the output isolation switch-component (MOSFET) is turned off in advance, so that a power isolation function is started/activated before the reverse current flows into the power supplier.

19 Claims, 3 Drawing Sheets

POWER SUPPLY APPARATUS

CROSS-REFERENCE TO RELATED APPLICATION

This application claims the priority benefit of China application serial no. 201210217783.X, filed on Jun. 28, 2012. The entirety of the above-mentioned patent application is hereby incorporated by reference herein and made a part of this specification.

BACKGROUND OF THE INVENTION

1. Field of the Invention

The present invention generally relates to a power supply apparatus, and more particularly, to a power supply apparatus which offers a power isolation function to prevent reverse current.

2. Description of Related Art

In a high-end electronic product (for example, a server or an industrial computer), two power suppliers of the same specifications and both offering a negative feedback control function are usually connected in parallel for supplying electric power required by the operation of the electronic product (i.e., a load). In this case, an output isolation switch-component (for example, a metal-oxide-semiconductor field-effect transistor (MOSFET)) is disposed on the output path of each power supplier. The output isolation switch-component is turned on by a comparator when the output current of the power supplier forwardly flows to the load and turned off when a reverse current flows to the power supplier. Thereby, an output power isolation is achieved.

However, to meet today's requirement for high efficiency, an output isolation switch-component is usually implemented by using a MOSFET with low conductive impedance (Rds-on). Accordingly, the voltage drop on the output isolation switch-component (i.e., the voltage difference between the drain and the source of a MOSFET) is very small.

Moreover, the comparator controlling the on/off of an output isolation switch-component may produce offset errors. As a result, the comparator may not be able to determine the voltage difference on the output isolation switch-component correctly when the load is a light load (because in this case the output current of the power supplier is small). Accordingly, the comparator may not be able to turn off the output isolation switch-component (MOSFET) when a reverse current flows to the power supplier. Instead, the comparator turns off the output isolation switch-component (MOSFET) only when the reverse current is large enough. Thus, the power supplier may be damaged or may malfunction due to the large reverse current.

Thereby, with today's requirement for high efficiency, the conventional output power isolation technique cannot effectively resolve the problem produced when a reverse current flows to a power supplier under the load is a light load.

SUMMARY OF THE INVENTION

Accordingly, the present invention is directed to a power supply apparatus, in which the problem in the conventional technique is effectively resolved.

Additional aspects and/or advantages of the invention will be set forth in part in the description which follows and, in part, will be obvious from the description, or may be learned by practice of the invention.

An exemplary embodiment of the present invention provides a power supply apparatus including a first power supplier. The first power supplier receives a DC input voltage and generates a DC output voltage according to the DC input voltage. The first power supplier includes a main power generation unit, an output isolation switch-component, a voltage-feedback controller, and an isolation control circuit. The main power generation unit receives and converts the DC input voltage to generate a main power. The output isolation switch-component receives and conducts the main power in response to a normal power supply request to output the DC output voltage.

The voltage-feedback controller is coupled to the main power generation unit and the output isolation switch-component. The voltage-feedback controller generates a control signal in response to the main power received by the output isolation switch-component and controls the main power generation unit to adjust the main power. The isolation control circuit is coupled to the main power generation unit and the output isolation switch-component. The isolation control circuit adjusts the conductive impedance of the output isolation switch-component in response to the satisfaction of an impedance adjusting condition and turns off the output isolation switch-component in response to the satisfaction of a light-loading condition.

According to an exemplary embodiment of the present invention, the power supply apparatus further includes a second power supplier. The second power supplier receives the DC input voltage and generates the DC output voltage according to the DC input voltage. The DC output voltages respectively generated by the first power supplier and the second power supplier are both supplied to a load.

According to an exemplary embodiment of the present invention, the output isolation switch-component includes an N-type transistor. The drain of the N-type transistor receives the main power, and the source of the N-type transistor outputs the DC output voltage to the load in response to the normal power supply request. The N-type transistor can be implemented by using an N-type metal-oxide-semiconductor field-effect transistor (MOSFET). However, the present invention is not limited thereto.

According to an exemplary embodiment of the present invention, the isolation control circuit includes a current sampling unit, a voltage comparator, and an impedance adjusting unit. The current sampling unit is coupled between the main power generation unit and the output isolation switch-component. The current sampling unit samples an output current corresponding to the first power supplier to obtain a current sampled voltage. The voltage comparator is coupled to the current sampling unit. The voltage comparator compares the current sampled voltage with a predetermined reference voltage to obtain and output a comparison result. The impedance adjusting unit is coupled to the voltage comparator and the output isolation switch-component. The impedance adjusting unit determines whether to adjust the conductive impedance of the output isolation switch-component in response to the comparison result.

According to an exemplary embodiment of the present invention, when the current sampled voltage is lower than the predetermined reference voltage, the voltage comparator obtains and outputs the comparison result which indicates that the impedance adjusting condition is satisfied to enable the impedance adjusting unit, so that the impedance adjusting unit adjusts the conductive impedance of the output isolation switch-component. On the other hand, when the current sampled voltage is higher than the predetermined reference voltage, the voltage comparator obtains and outputs the comparison result which indicates that the impedance adjusting condition is not satisfied to disable the impedance adjusting unit, so that the impedance adjusting unit does not adjust the conductive impedance of the output isolation switch-component.

According to an exemplary embodiment of the present invention, the current sampling unit includes a sampling resistor and a current sampling amplifier. The first end of the sampling resistor receives the main power from the main power generation unit, and the second end of the sampling resistor is coupled to the drain of the N-type transistor. The positive input terminal of the current sampling amplifier is coupled to the first end of the sampling resistor, the negative input terminal of the current sampling amplifier is coupled to the second end of the sampling resistor, and the output terminal of the current sampling amplifier outputs the current sampled voltage.

According to an exemplary embodiment of the present invention, the negative input terminal of the voltage comparator receives the current sampled voltage, the positive input terminal of the voltage comparator receives the predetermined reference voltage, and the output terminal of the voltage comparator outputs the comparison result.

According to an exemplary embodiment of the present invention, the impedance adjusting unit includes an impedance adjusting amplifier and a level holding circuit. When the impedance adjusting condition is satisfied, the impedance adjusting amplifier adjusts the conductive impedance of the output isolation switch-component in response to a holding level until the source voltage of the N-type transistor is equal to the holding level. The level holding circuit provides the holding level to the impedance adjusting amplifier in response to the main power.

According to an exemplary embodiment of the present invention, the positive input terminal of the impedance adjusting amplifier receives the holding level from the level holding circuit, the negative input terminal of the impedance adjusting amplifier is coupled to the source of the N-type transistor and the output terminal of the voltage comparator, and the output terminal of the impedance adjusting amplifier is coupled to the gate of the N-type transistor.

According to an exemplary embodiment of the present invention, the impedance adjusting unit further includes a current-limiting resistor. The current-limiting resistor is coupled between the negative input terminal of the impedance adjusting amplifier and the source of the N-type transistor.

According to an exemplary embodiment of the present invention, the level holding circuit includes a first voltage-dividing resistor, a second voltage-dividing resistor, and a holding capacitor. The first end of the first voltage-dividing resistor is coupled to the second end of the sampling resistor and the drain of the N-type transistor, and the second end of the first voltage-dividing resistor generates the holding level and provides the holding level to the positive input terminal of the impedance adjusting amplifier. The first end of the second voltage-dividing resistor is coupled to the second end of the first voltage-dividing resistor, and the second end of the second voltage-dividing resistor is coupled to a ground potential. The holding capacitor and the second voltage-dividing resistor are connected in parallel.

According to an exemplary embodiment of the present invention, when the impedance adjusting condition is satisfied, the impedance adjusting amplifier further determines whether to turn off the output isolation switch-component in response to a comparison between the holding level and the source voltage of the N-type transistor. When the source voltage of the N-type transistor is higher than the holding level, the light-loading condition is satisfied, and accordingly the impedance adjusting amplifier turns off the output isolation switch-component.

According to an exemplary embodiment of the present invention, the isolation control circuit further includes an isolation amplifier. When the impedance adjusting condition is not satisfied, the isolation amplifier turns off the output isolation switch-component in response to the satisfaction of a heavy-loading condition. The positive input terminal of the isolation amplifier is coupled to the drain of the N-type transistor, the negative input terminal of the isolation amplifier is coupled to the source of the N-type transistor, and the output terminal of the isolation amplifier is coupled to the gate of the N-type transistor. When the source voltage of the N-type transistor is higher than the drain voltage of the N-type transistor, the heavy-loading condition is satisfied, and accordingly the isolation amplifier turns off the output isolation switch-component.

According to an exemplary embodiment of the present invention, the circuit structure of the second power supplier can be the same as or different from the circuit structure of the first power supplier.

According to an exemplary embodiment of the present invention, the main power generation unit is a DC-to-DC converter, and the DC-to-DC converter can be implemented by using an isolation or non-isolation boost and/or buck converter.

As described above, in the present invention, the conductive impedance (Rds-on) of the output isolation switch-component (N-type transistor) in each power supplier is changed/adjusted when the load is a light load, so as to balance the voltages (i.e., the source voltage of the output isolation switch-component (N-type transistor) and the holding level) on two light-loading setting points (not the source or drain of the output isolation switch-component (N-type transistor)). Once the voltages on the two light-loading setting points are not balanced (i.e., an external reverse current is about to flow into the power supplier), the impedance adjusting amplifier turns off the output isolation switch-component (N-type transistor) in advance, so that the power isolation function is started/activated before the reverse current flows into the power supplier. Thereby, the problem in the conventional technique is effectively resolved.

On the other hand, in the present invention, the conductive impedance (Rds-on) of the output isolation switch-component (N-type transistor) in each power supplier is not changed/adjusted when the load is a heavy load, and whether the output isolation switch-component (N-type transistor) is turned off is determined according to the voltage difference between the two heavy-loading setting points (i.e., the source/drain voltage of the output isolation switch-component (N-type transistor)). Once the source voltage of the output isolation switch-component (N-type transistor) is higher than the drain voltage thereof (i.e., an external reverse current is about to flow into the power supplier), the isolation amplifier instantly turns off the output isolation switch-component (N-type transistor) to start/activate the power isolation function, so that the power supplier is protected from any (large) reverse current.

These and other exemplary embodiments, features, aspects, and advantages of the present invention will be described and become more apparent from the detailed description of exemplary embodiments when read in conjunction with accompanying drawings. However, foregoing general descriptions and following embodiments are only exemplary but not intended to limit the scope of the present invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
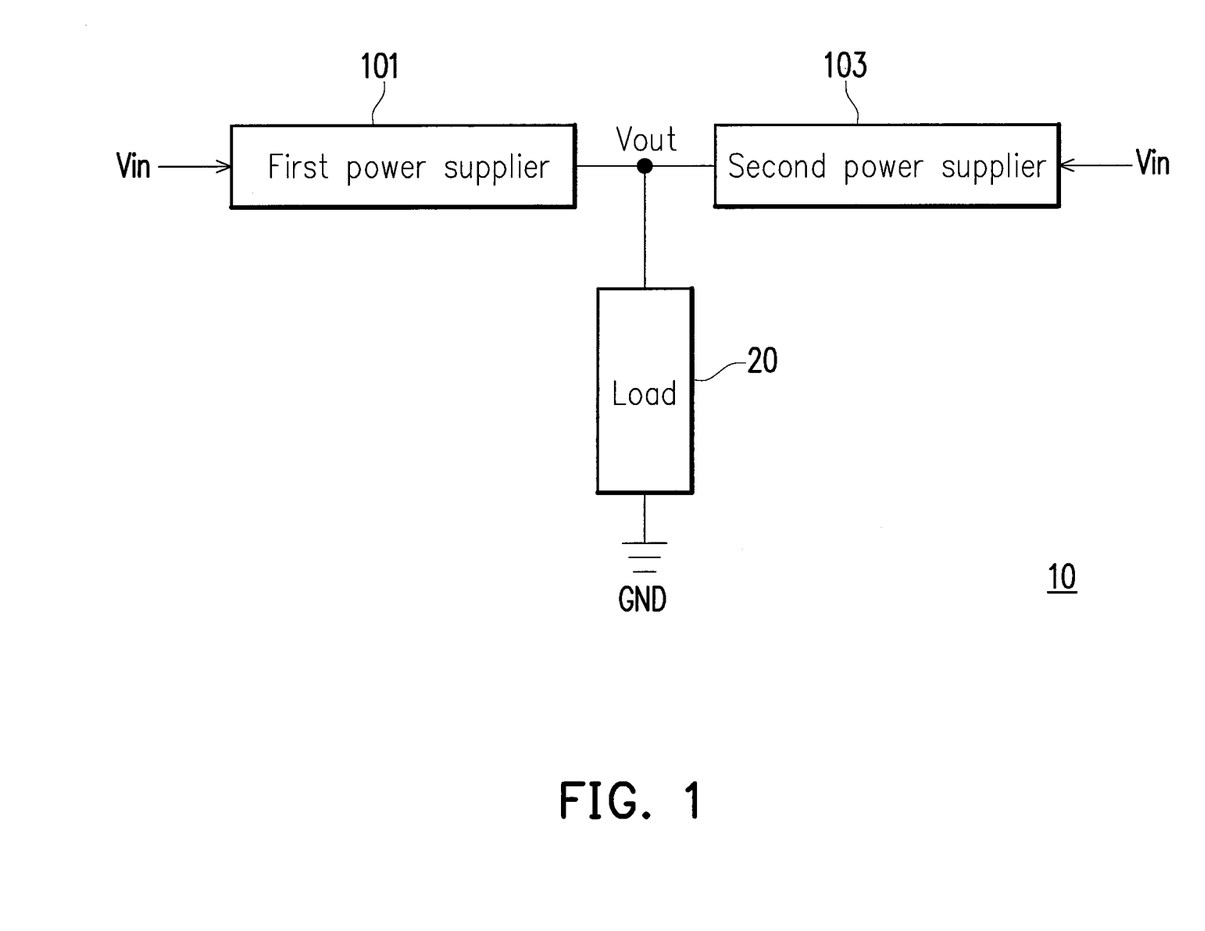
FIG. 1 is a diagram of a power supply apparatus according to an exemplary embodiment of the present invention.

FIG. 1 is a diagram of a power supply apparatus according to an exemplary embodiment of the present invention. Referring to FIG. 1, the power supply apparatus 10 includes a first power supplier 101 and a second power supplier 103. Both the first power supplier 101 and the second power supplier 103 offer (or have) a negative feedback control function.

In the present exemplary embodiment, the first power supplier 101 and the second power supplier 103 are connected in parallel. The first power supplier 101 and the second power supplier 103 respectively receive a DC input voltage Vin and generate a DC output voltage Vout for a load 20 (a high-end electronic product, such as a server or an industrial computer, however, the type of the load 20 is not limited herein) according to the DC input voltage Vin. In other words, the first power supplier 101 and the second power supplier 103 supply the electric power required by the operation of the load 20 at the same time.

Figure 2:
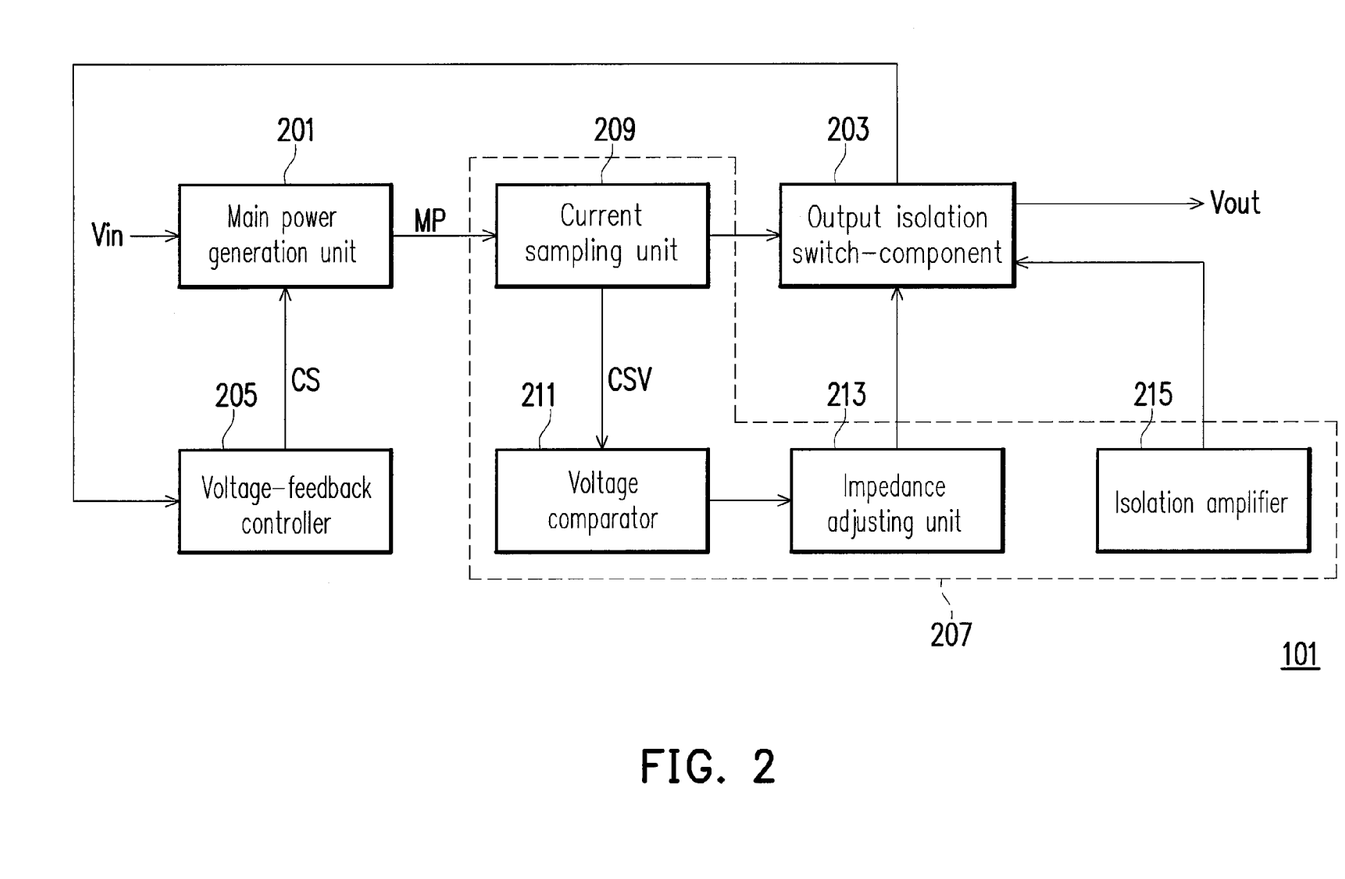
FIG. 2 is a block diagram of a first power supplier in FIG. 1.
Figure 3:
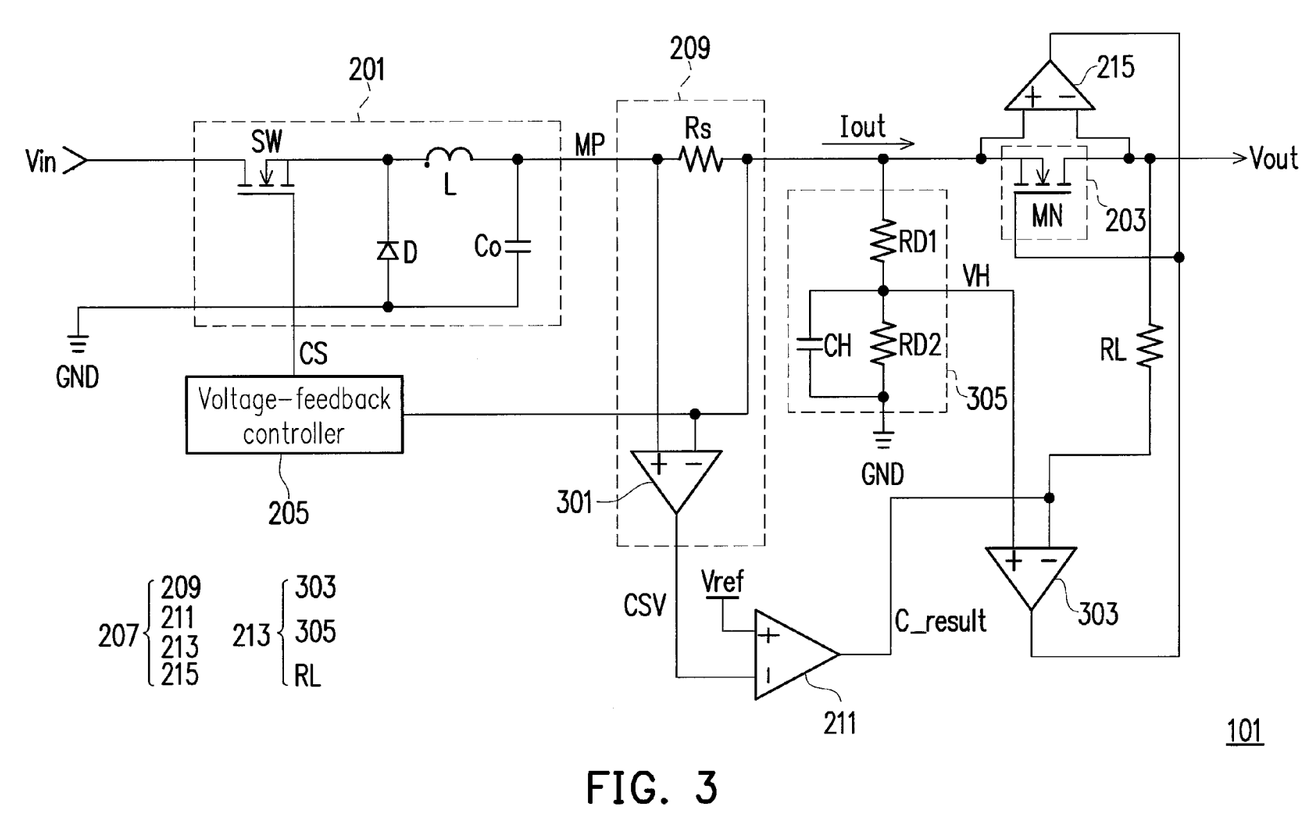
FIG. 3 is a circuit diagram of the first power supplier in FIG. 1.

FIG. 2 is a block diagram of the first power supplier 101 in FIG. 1, and FIG. 3 is a circuit diagram of the first power supplier 101 in FIG. 1. Referring to FIGS. 1-3, the first power supplier 101 includes a main power generation unit 201, an output isolation switch-component 203, a voltage-feedback controller 205, and an isolation control circuit 207.

In the present exemplary embodiment, the main power generation unit 201 is a DC-to-DC converter, such as a buck converter. However, the present invention is not limited thereto. Besides, the main power generation unit 201 receives and converts the DC input voltage Vin to generate a main power MP.

To be specific, the main power generation unit 201 includes a switch SW, a diode D, an inductor L, and a capacitor Co. The switch SW is implemented by using a metal-oxide-semiconductor field-effect transistor (MOSFET). The first terminal of the switch SW receives the DC input voltage Vin, and the control terminal of the switch SW receives a control signal CS from the voltage-feedback controller 205. The anode of the diode D is coupled to the ground potential GND, and the cathode of the diode D is coupled to the second terminal of the switch SW. The first end of the inductor L is coupled to the second terminal of the switch SW, and the second end of the inductor L generates and outputs the main power MP. The first end of the capacitor Co is coupled to the second end of the inductor L, and the second end of the capacitor Co is coupled to the ground potential GND.

In the present exemplary embodiment, the function of the diode D can be accomplished through the body diode (i.e., a synchronous rectifier (SR)) of a MOSFET. This can be done by simply implementing a control mechanism in the first power supplier 101 to control the on/off the SR. However, in other exemplary embodiments of the present invention, the main power generation unit 201 may also be implemented by using any other isolation or non-isolation boost and/or buck converter.

Additionally, the power conversion topology of the main power generation unit 201 is not limited to aforementioned boost and/or buck topology but may also be a forward topology, a flyback topology, or a push-pull topology. The power conversion topology of the main power generation unit 201 is determined according to the actual design/application requirement.

The output isolation switch-component 203 receives and conducts the main power MP in response to a normal power supply request of the load 20, so as to output the DC output voltage Vout to the load 20. In the present exemplary embodiment, the output isolation switch-component 203 can be implemented by using an N-type transistor MN (for example, an N-type MOSFET). However, the present invention is not limited thereto. The drain of the N-type transistor MN receives the main power MP, and the source of the N-type transistor MN outputs the DC output voltage Vout to the load 20 in response to the normal power supply request of the load 20.

The voltage-feedback controller 205 is coupled to the main power generation unit 201 and the output isolation switch-component 203 (i.e., the control terminal of the switch SW and the drain of the N-type transistor MN). The voltage-feedback controller 205 generates the control signal CS in response to the main power MP received by the output isolation switch-component 203, so as to control the operation of the main power generation unit 201 and adjust (for example, increase or decrease) the main power MP.

The isolation control circuit 207 is coupled to the main power generation unit 201 and the output isolation switch-component 203. The isolation control circuit 207 adjusts the conductive impedance (Rds-on) of the output isolation switch-component 203 (N-type transistor MN) in response to the satisfaction of a predetermined impedance adjusting condition (will be explained later on) and turns off the output isolation switch-component 203 (N-type transistor MN) in response to the satisfaction of a predetermined light-loading condition (will be explained later on).

To be specific, the isolation control circuit 207 includes a current sampling unit 209, a voltage comparator 211, an impedance adjusting unit 213, and an isolation amplifier 215. The current sampling unit 209 is coupled between the main power generation unit 201 and the output isolation switch-component 203 (N-type transistor MN). The current sampling unit 209 samples the output current Tout corresponding to the first power supplier 101 to obtain a current sampled voltage CSV.

In the present exemplary embodiment, the current sampling unit 209 includes a sampling resistor Rs and a current sampling amplifier 301. The first end of the sampling resistor Rs receives the main power MP from the main power generation unit 201, and the second end of the sampling resistor Rs is coupled to the drain of the N-type transistor MN. The positive input terminal (+) of the current sampling amplifier 301 is coupled to the first end of the sampling resistor Rs, the negative input terminal (−) of the current sampling amplifier 301 is coupled to the second end of the sampling resistor Rs, and the output terminal of the current sampling amplifier 301 outputs the current sampled voltage CSV.

The voltage comparator 211 is coupled to the current sampling unit 209. The voltage comparator 211 compares the current sampled voltage CSV from the current sampling unit 209 with a predetermined reference voltage Vref to obtain and output a comparison result C_result. In the present exemplary embodiment, the negative input terminal (−) of the voltage comparator 211 receives the current sampled voltage CSV from the current sampling unit 209, the positive input terminal (+) of the voltage comparator 211 receives the predetermined reference voltage Vref, and the output terminal of the voltage comparator 211 outputs the comparison result C_result. The predetermined reference voltage Vref is determined according to the actual design/application requirement, and which should be corresponding to a light-loading setting point representing the load.

The impedance adjusting unit 213 is coupled to the voltage comparator 211 and the output isolation switch-component 203 (N-type transistor MN). The impedance adjusting unit 213 determines whether to adjust the conductive impedance (Rds-on) of the output isolation switch-component 203 (N-type transistor MN) in response to the comparison result C_result from the voltage comparator 211.

In the present exemplary embodiment, when the current sampled voltage CSV is lower than the predetermined reference voltage Vref, the voltage comparator 211 obtains and outputs the comparison result C_result which represents the satisfaction of the predetermined impedance adjusting condition (herein the load 20 can be considered as being in a light-loading state), so as to enable the impedance adjusting unit 213 and allow the impedance adjusting unit 213 to adjust the conductive impedance (Rds-on) of the output isolation switch-component 203 (N-type transistor MN).

Contrarily, when the current sampled voltage CSV is higher than the predetermined reference voltage Vref, the voltage comparator 211 obtains and outputs the comparison result C_result which represents the dissatisfaction of the predetermined impedance adjusting condition (herein the load 20 can be considered as being in a heavy-loading state, but not limited thereto) to disable the impedance adjusting unit 213, so that the impedance adjusting unit 213 does not adjust the conductive impedance (Rds-on) of the output isolation switch-component 203 (N-type transistor MN).

In the present exemplary embodiment, the impedance adjusting unit 213 includes an impedance adjusting amplifier 303, a level holding circuit 305, and a current-limiting resistor RL. When the predetermined impedance adjusting condition is satisfied, the impedance adjusting amplifier 303 adjusts the conductive impedance (Rds-on) of the output isolation switch-component 203 (N-type transistor MN) in response to a holding level VH from the level holding circuit 305 until the source voltage Vs of the N-type transistor MN is equal to the holding level VH. In addition, the level holding circuit 305 provides the holding level VH to the impedance adjusting amplifier 303 in response to the main power MP from the main power generation unit 201.

To be specific, the positive input terminal (+) of the impedance adjusting amplifier 303 receives the holding level VH from the level holding circuit 305. The negative input terminal (−) of the impedance adjusting amplifier 303 is coupled to the output terminal of the voltage comparator 211 and can be coupled to the source of the N-type transistor MN via the current-limiting resistor RL. The output terminal of the impedance adjusting amplifier 303 is coupled to the gate of the N-type transistor MN. In the present exemplary embodiment, the current-limiting resistor RL is coupled between the negative input terminal (−) of the impedance adjusting amplifier 303 and the source of the N-type transistor MN. However, in other exemplary embodiments, the current-limiting resistor RL may be optional. Thus, the negative input terminal (−) of the impedance adjusting amplifier 303 may also be directly coupled to the source of the N-type transistor MN. Whether the current-limiting resistor RL is disposed should be determined according to the actual design/application requirement.

The level holding circuit 305 includes a first voltage-dividing resistor RD1, a second voltage-dividing resistor RD2, and a holding capacitor CH. The first end of the first voltage-dividing resistor RD1 is coupled to the second end of the sampling resistor Rs and the drain of the N-type transistor MN, and the second end of the first voltage-dividing resistor RD1 generates the holding level VH and provides the holding level VH to the positive input terminal (+) of the impedance adjusting amplifier 303. The first end of the second voltage-dividing resistor RD2 is coupled to the second end of the first voltage-dividing resistor RD1, and the second end of the second voltage-dividing resistor RD2 is coupled to the ground potential GND. The holding capacitor CH and the second voltage-dividing resistor RD2 are connected in parallel. In this case, VH=(RD2/(RD1+RD2))*MP.

In the present exemplary embodiment, when the predetermined impedance adjusting condition is satisfied (i.e., the load 20 is in a light-loading state), the impedance adjusting amplifier 303 further determines whether to turn off the output isolation switch-component 203 (N-type transistor MN) in response to a comparison between the holding level VH from the level holding circuit 305 and the source voltage Vs of the N-type transistor MN.

When the source voltage Vs of the N-type transistor MN is higher than the holding level VH from the level holding circuit 305, the predetermined light-loading condition is satisfied (herein it is considered that a reverse current from the second power supplier 103 is about to flow into the first power supplier 101), and accordingly the impedance adjusting amplifier 303 turns off the output isolation switch-component 203 (N-type transistor MN) in advance. In other words, the power isolation function is started/activated before the reverse current from the second power supplier 103 flows into the first power supplier 101.

On the other hand, when the predetermined impedance adjusting condition is not satisfied (i.e., the load 20 is in a heavy-loading state, but not limited thereto), the isolation amplifier 215 turns off the output isolation switch-component 203 (N-type transistor MN) in response to the satisfaction of the predetermined heavy-loading condition. To be specific, the positive input terminal (+) of the isolation amplifier 215 is coupled to the drain of the N-type transistor MN, the negative input terminal (−) of the isolation amplifier 215 is coupled to the source of the N-type transistor MN, and the output terminal of the isolation amplifier 215 is coupled to the gate of the N-type transistor MN.

In the present exemplary embodiment, when the predetermined impedance adjusting condition is not satisfied (i.e., the load 20 is in a heavy-loading state) and the source voltage Vs of the N-type transistor MN is higher than the drain voltage Vd thereof, the predetermined heavy-loading condition is satisfied (herein it is considered that a reverse current from the second power supplier 103 is about to flow into the first power supplier 101), and accordingly the isolation amplifier 215 turns off the output isolation switch-component 203 (N-type transistor MN). In other words, the power isolation function is started/activated to prevent the first power supplier 101 from being damaged by the (large) reverse current.

As described above, if the load 20 is in the light-loading state and the current sampled voltage CSV output by the current sampling unit 209 is lower than the predetermined reference voltage Vref, the voltage comparator 211 obtains and outputs the comparison result C_result which represents the satisfaction of the predetermined impedance adjusting condition, so as to enable the impedance adjusting unit 213 and allow the impedance adjusting unit 213 to adjust the conductive impedance (Rds-on) of the N-type transistor MN. To be specific, through the control of the impedance adjusting amplifier 303 (i.e., changing/adjusting the gate/source voltage Vgs of the N-type transistor MN), the N-type transistor MN operates in a saturation region, and the conductive impedance (Rds-on) thereof is changed/adjusted accordingly. Thereby, the source voltage of the N-type transistor MN is controlled at the holding level VH (i.e., Vs=VH).

In the case that the source voltage of the N-type transistor MN is controlled to be at the holding level VH, once the source voltage of the N-type transistor MN increases, an external reverse current (for example, from the second power supplier 103) is about to flow into the first power supplier 101, and accordingly, the source voltage Vs of the N-type transistor MN goes higher than the holding level VH (due to the holding capacitor CH, the holding level VH does not increase with the source voltage of the N-type transistor MN instantly). Thus, the impedance adjusting amplifier 303 turns off the output isolation switch-component 203 (N-type transistor MN) in advance. Namely, the power isolation function is started/activated before the reverse current flows into the first power supplier 101. Thereby, the problem in the conventional technique is effectively resolved.

On the other hand, if the load 20 is in a non-light-loading state (for example, a heavy-loading state, but not limited thereto), and the current sampled voltage CSV output by the current sampling unit 209 is higher than the predetermined reference voltage Vref, the voltage comparator 211 obtains and outputs the comparison result C_result which represents the dissatisfaction of the predetermined impedance adjusting condition to disable the impedance adjusting unit 213, so that the impedance adjusting unit 213 does not adjust the conductive impedance (Rds-on) of the N-type transistor MN.

Meanwhile, because the first power supplier 101 supplies a larger output current Iout when the load 20 is in a heavy-loading state, whether to turn off the output isolation switch-component 203 (N-type transistor MN) can be determined by comparing the source/drain voltage Vds of the output isolation switch-component 203 (N-type transistor MN) through the isolation amplifier 215. If the source voltage Vs of the output isolation switch-component 203 (N-type transistor MN) is higher than the drain voltage Vd thereof (i.e., an external reverse current flows into the first power supplier 101), the isolation amplifier 215 instantly turns off the output isolation switch-component 203 (N-type transistor MN) to start/activate the power isolation function, so as to prevent the first power supplier 101 from being affected by the (large) reverse current.

It should be mentioned herein that the circuit structure/configuration of the second power supplier 103 is, preferably, the same as that of the first power supplier 101 (as shown in FIG. 3). However, the circuit structure/configuration of the second power supplier 103 may also be different from the circuit structure/configuration of the first power supplier 101, which should be determined according to the actual design/application requirement.

If the circuit structure/configuration of the second power supplier 103 is the same as the circuit structure/configuration of the first power supplier 101, the second power supplier 103 can be implemented by using the circuit pattern illustrated in FIG. 3, and the operation thereof is similar to that of the first power supplier 101.

If the circuit structure/configuration of the second power supplier 103 is different from the circuit structure/configuration of the first power supplier 101, the second power supplier 103 can be implemented by using a circuit pattern similar to that illustrated in FIG. 3 but does not include the current sampling amplifier 301, the voltage comparator 211, the impedance adjusting amplifier 303, the current-limiting resistor RL, and the level holding circuit 305 in FIG. 3.

As described above, in the present invention, the conductive impedance (Rds-on) of the output isolation switch-component 203 (N-type transistor MN) in each power supplier 101/103 is changed/adjusted when the load 20 is a light load, so as to balance the voltages (i.e., the source voltage Vs of the output isolation switch-component 203 (N-type transistor MN) and the holding level VH) on two light-loading setting points (not the source or drain of the output isolation switch-component 203 (N-type transistor MN)). Once the voltages on the two light-loading setting points are not balanced (i.e., an external reverse current is about to flow into the power supplier), the impedance adjusting amplifier 303 turns off the output isolation switch-component 203 (N-type transistor MN) in advance, so that the power isolation function is started/activated before the reverse current flows into the power supplier. Thereby, the problem in the conventional technique is effectively resolved.

On the other hand, in the present invention, the conductive impedance (Rds-on) of the output isolation switch-component 203 (N-type transistor MN) in each power supplier 101/103 is not changed/adjusted when the load 20 is a heavy load, and whether the output isolation switch-component 203 (N-type transistor MN) is turned off is determined according to the voltage difference between the two heavy-loading setting points (i.e., the source/drain voltage Vds of the output isolation switch-component 203 (N-type transistor MN)). Once the source voltage Vs of the output isolation switch-component 203 (N-type transistor MN) is higher than the drain voltage Vd thereof (i.e., an external reverse current is about to flow into the power supplier), the isolation amplifier 215 instantly turns off the output isolation switch-component 203 (N-type transistor MN) to start/activate the power isolation function, so that the power supplier is protected from any (large) reverse current.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A power supply apparatus, comprising:
 a first power supplier, receiving a DC input voltage, and generating a DC output voltage according to the DC input voltage, wherein the first power supplier comprises:
 a main power generation unit, receiving and converting the DC input voltage to generate a main power;
 an output isolation switch-component, receiving and conducting the main power in response to a normal power supply request to output the DC output voltage;
 a voltage-feedback controller, coupled to the main power generation unit and the output isolation switch-component, generating a control signal in response to the main power received by the output isolation switch-component to control the main power generation unit to adjust the main power; and an isolation control circuit, coupled to the main power generation unit and the output isolation switch-component, adjusting a conductive impedance of the output isolation switch-component in response to the satisfaction of an impedance adjusting condition, and turning off the output isolation switch-component in response to the satisfaction of a light-loading condition, wherein the isolation control circuit comprises:

an isolation amplifier, turning off the output isolation switch-component in response to the satisfaction of a heavy-loading condition when the impedance adjusting condition is not satisfied.

2. The power supply apparatus according to claim 1 further comprising:

a second power supplier, receiving the DC input voltage, and generating the DC output voltage according to the DC input voltage, wherein the DC output voltages respectively generated by the first power supplier and the second power supplier are both supplied to a load.

3. The power supply apparatus according to claim 2, wherein the output isolation switch-component comprises an N-type transistor, a drain of the N-type transistor receives the main power, and a source of the N-type transistor outputs the DC output voltage to the load in response to the normal power supply request.

4. The power supply apparatus according to claim 3, wherein the N-type transistor is an N-type metal-oxide-semiconductor field-effect transistor (MOSFET).

5. The power supply apparatus according to claim 3, wherein the isolation control circuit further comprises:

a current sampling unit, coupled between the main power generation unit and the output isolation switch-component, sampling an output current corresponding to the first power supplier to obtain a current sampled voltage;

a voltage comparator, coupled to the current sampling unit, and comparing the current sampled voltage with a predetermined reference voltage to obtain and output a comparison result; and an impedance adjusting unit, coupled to the voltage comparator and the output isolation switch-component, and determining whether to adjust the conductive impedance of the output isolation switch-component in response to the comparison result.

6. The power supply apparatus according to claim 5, wherein when the current sampled voltage is lower than the predetermined reference voltage, the voltage comparator obtains and outputs the comparison result representing the satisfaction of the impedance adjusting condition to enable the impedance adjusting unit, so that the impedance adjusting unit adjusts the conductive impedance of the output isolation switch-component; and when the current sampled voltage is higher than the predetermined reference voltage, the voltage comparator obtains and outputs the comparison result representing the dissatisfaction of the impedance adjusting condition to disable the impedance adjusting unit, so that the impedance adjusting unit does not adjust the conductive impedance of the output isolation switch-component.

7. The power supply apparatus according to claim 6, wherein the current sampling unit comprises:

a sampling resistor, having a first end for receiving the main power from the main power generation unit, and having a second end coupled to the drain of the N-type transistor; and a current sampling amplifier, having a positive input terminal coupled to the first end of the sampling resistor, having a negative input terminal coupled to the second end of the sampling resistor, and having an output terminal for outputting the current sampled voltage.

8. The power supply apparatus according to claim 7, wherein a negative input terminal of the voltage comparator receives the current sampled voltage, a positive input terminal of the voltage comparator receives the predetermined reference voltage, and an output terminal of the voltage comparator outputs the comparison result.

9. The power supply apparatus according to claim 8, wherein the impedance adjusting unit comprises:

an impedance adjusting amplifier, adjusting the conductive impedance of the output isolation switch-component in response to a holding level when the impedance adjusting condition is satisfied until a source voltage of the N-type transistor is equal to the holding level; and a level holding circuit, providing the holding level to the impedance adjusting amplifier in response to the main power.

10. The power supply apparatus according to claim 9, wherein a positive input terminal of the impedance adjusting amplifier receives the holding level from the level holding circuit, a negative input terminal of the impedance adjusting amplifier is coupled to the source of the N-type transistor and the output terminal of the voltage comparator, and an output terminal of the impedance adjusting amplifier is coupled to a gate of the N-type transistor.

11. The power supply apparatus according to claim 10, wherein the impedance adjusting unit further comprises:

a current-limiting resistor, coupled between the negative input terminal of the impedance adjusting amplifier and the source of the N-type transistor.

12. The power supply apparatus according to claim 11, wherein the level holding circuit comprises:

a first voltage-dividing resistor, having a first end coupled to the second end of the sampling resistor and the drain of the N-type transistor, and having a second end for generating and providing the holding level to the positive input terminal of the impedance adjusting amplifier;

a second voltage-dividing resistor, having a first end coupled to the second end of the first voltage-dividing resistor, and having a second end coupled to a ground potential; and a holding capacitor, connected with the second voltage-dividing resistor in parallel.

13. The power supply apparatus according to claim 9, wherein the impedance adjusting amplifier further determines whether to turn off the output isolation switch-component in response to a comparison between the holding level and the source voltage of the N-type transistor when the impedance adjusting condition is satisfied.

14. The power supply apparatus according to claim 13, wherein when the source voltage of the N-type transistor is higher than the holding level, the light-loading condition is satisfied, and accordingly the impedance adjusting amplifier turns off the output isolation switch-component.

15. The power supply apparatus according to claim 6, wherein a positive input terminal of the isolation amplifier is coupled to the drain of the N-type transistor, a negative input terminal of the isolation amplifier is coupled to the source of the N-type transistor, and an output terminal of the isolation amplifier is coupled to the gate of the N-type transistor.

16. The power supply apparatus according to claim 15, wherein when the source voltage of the N-type transistor is higher than a drain voltage of the N-type transistor, the heavy-loading condition is satisfied, and accordingly, the isolation amplifier turns off the output isolation switch-component.

17. The power supply apparatus according to claim 6 wherein a circuit structure of the second power supplier is the same as or different from a circuit structure of the first power supplier.

18. The power supply apparatus according to claim 17, wherein the main power generation unit is a DC-to-DC converter.

19. The power supply apparatus according to claim 18, wherein the DC-to-DC converter comprises an isolation or non-isolation boost and/or buck converter.

* * * * *